E. KANDLER.
ADJUSTING MECHANISM FOR LENS CASINGS.
APPLICATION FILED NOV. 17, 1913.
1,127,449.
Patented Feb. 9, 1915.
2 SHEETS—SHEET 1.
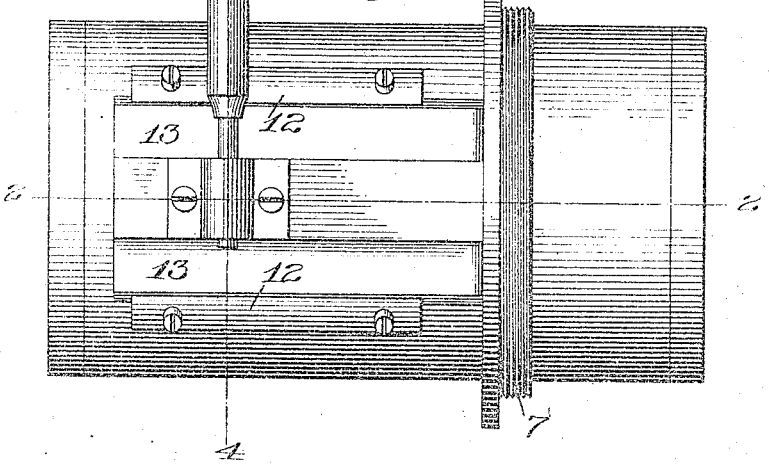
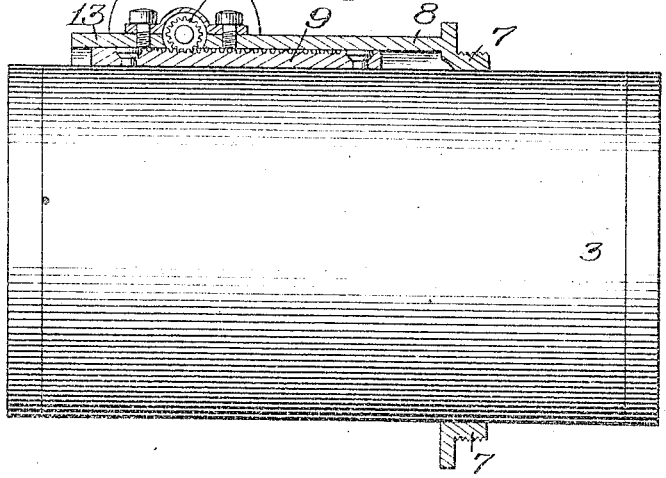

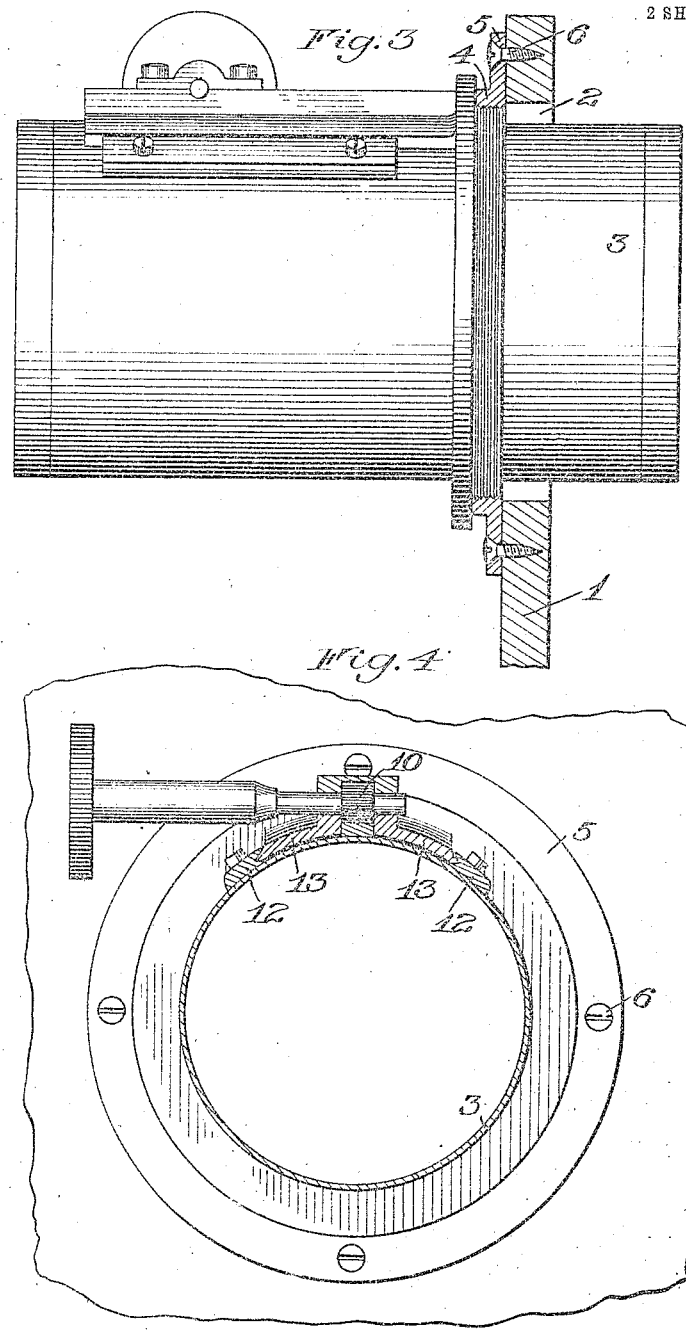

UNITED STATES PATENT OFFICE.

EDMUND KANDLER, OF ROCHESTER, NEW YORK, ASSIGNOR TO BAUSCH & LOMB OPTICAL COMPANY, OF ROCHESTER, NEW YORK, A CORPORATION OF NEW YORK.

ADJUSTING MECHANISM FOR LENS-CASINGS.

1,127,449.   Specification of Letters Patent.   Patented Feb. 9, 1915.

Application filed November 17, 1913. Serial No. 801,351.

*To all whom it may concern:*

Be it known that I, EDMUND KANDLER, of Rochester, in the county of Monroe and State of New York, have invented certain new and useful Improvements in Adjusting Mechanism for Lens-Casings; and I do hereby declare that the following is a full, clear, and exact description of the same, reference being had to the accompanying drawings, forming a part of this specification, and to the reference-numerals marked thereon.

My invention relates to projection apparatus and similar mechanism, that include casings or mounts for lenses that require longitudinal adjustment for focusing, and it has for its primary object to provide a structure that may be readily attached to the frame of a machine, and affords a convenient arrangement of parts for permitting the lens system to be quickly adjusted.

A further purpose of the invention resides in providing means for guiding the movement of the lens casing during its adjustment so as to maintain it constantly in its proper relation to the frame or stationary parts of the apparatus.

To these and other ends the invention consists in certain improvements and combinations of parts, all as will be hereinafter more fully described, the novel features being pointed out in the claims at the end of the specification.

In the drawings: Figure 1 is a plan view of one embodiment of my invention; Fig. 2 is a vertical sectional view on the line 2ª—2ª of Fig. 1; Fig. 3 is a side elevation with parts in section, and Fig. 4 is a transverse sectional view.

Similar reference numerals throughout the several figures indicate the same parts.

In the construction shown, 1 designates a standard or support arranged in any suitable manner upon the frame, said support being provided with the opening 2, to receive the cylindrical lens casing 3 in which the usual adjustable lens system is mounted. Detachably mounted on the support 1 is an interiorly threaded ring 4, flanged at 5 and held in engagement with the support by means of the screws 6, and adjustably arranged within the ring 4 is a holder having a threaded portion 7 which engages said ring, and provided with an extension 8 for a purpose that will presently appear. The circular portion 7 and the extension 8 serve to support the lens casing in the desired position of adjustment, such adjustment being obtained preferably by the mechanism that I will now describe. To this end, the lens casing 3 has secured thereto a rack 9 which is arranged to be engaged by a pinion 10, the latter being journaled upon the extension 8 of the holder and operable by means of a thumb wheel 11. It will be seen that by turning the wheel 11 in one direction or the other, the lens casing is moved back and forth within the holder.

While the parts thus far described serve to afford an operative device, I have found that in order to insure holding the lenses accurately in their true positions, it is necessary to provide supplemental guiding instrumentalities, consisting of a positive guiding connection between the lens casing and the holder. This I preferably accomplish by means of guideways carried on the casing and guiding portions on the holder which coöperate with the said guideways so as to always effect a movement of the lens casing in the direction of its longitudinal axis. In the present arrangement, the guiding device just referred to comprises guideways which are preferably of V-shaped formation and formed by tracks 12 attached to the casing 3. Coöperating with the guideways are guiding members or flanges 13, formed on the extension 8 of the holder and having their edges constructed to correspond to the shape of the guideways, whereby a fine and accurate contact is afforded between the relatively movable parts. By this construction, it is possible to obtain the necessary adjustments of the lens casing, and at the same time to hold the latter rigidly in any position, the guiding holder serving to always maintain the lens casing in its proper relation to the frame of the machine and in correct alinement.

While I have disclosed a specific embodiment of the invention, it will be obvious that the structure may be varied without departing from the essential features of the invention, and I intend to cover by this application any such modifications as may come within the scope of the claims hereinafter.

I claim as my invention:

1. The combination with a casing, of a holder for the casing, guideways or tracks arranged on one of said parts independently of each other, a rack secured to the part which carries the guideways and arranged intermediate the latter, guides on the other of said parts in engagement with the guideways and extending between the guideways and the rack, and operating means on the part which carries the guides, said operating means coöperating with the rack to adjust the casing.

2. The combination with a cylindrical casing, of a holder for the casing, guideways or tracks arranged on the casing and extending longitudinally of the same, a rack attached to the casing intermediate said guideways, guides on the holder having engagement with the guideways on the casing, said guides being curved laterally and embracing the cylindrical surface of the casing between the aforementioned rack and guideways, and operating means on the holder coöperating with the rack to adjust the casing.

EDMUND KANDLER.

Witnesses:
WILLIAM G. WOODWORTH,
HENRY C. THON.